(12) United States Patent
Bottger et al.

(10) Patent No.: US 8,035,269 B2
(45) Date of Patent: Oct. 11, 2011

(54) ELECTRIC MACHINE

(75) Inventors: Axel Bottger, Dresden (DE); Ullrich Kreiensen, Deisslingen (DE)

(73) Assignee: Minebea Co., Ltd., Nagano (JP)

( * ) Notice: Subject to any disclaimer, the term of this patent is extended or adjusted under 35 U.S.C. 154(b) by 275 days.

(21) Appl. No.: 12/389,068

(22) Filed: Feb. 19, 2009

(65) Prior Publication Data
US 2009/0224617 A1    Sep. 10, 2009

(30) Foreign Application Priority Data

Mar. 5, 2008   (DE) .......................... 10 2008 012 680
Dec. 19, 2008  (DE) .......................... 10 2008 064 131

(51) Int. Cl.
*H02K 3/34* (2006.01)
(52) U.S. Cl. ....................... 310/215; 310/214
(58) Field of Classification Search ................. 310/217, 310/43, 254, 89, 215, 216.011, 214
See application file for complete search history.

(56) References Cited

U.S. PATENT DOCUMENTS

| 4,818,911 A * | 4/1989 | Taguchi et al. ........ 310/216.105 |
| 4,825,114 A * | 4/1989 | Ohtsuka et al. ................. 310/90 |
| 5,698,925 A | 12/1997 | Coupart |
| 2006/0082242 A1* | 4/2006 | Schill ............................ 310/217 |
| 2006/0181173 A1* | 8/2006 | Takahashi et al. ............ 310/216 |

FOREIGN PATENT DOCUMENTS

DE    102005024739 A1    12/2006

* cited by examiner

*Primary Examiner* — Quyen Leung
*Assistant Examiner* — Leda Pham
(74) *Attorney, Agent, or Firm* — Duane Morris, LLP (57) ABSTRACT

An electric machine having a rotor and a stator that encloses the rotor, and having a first flange arrangement on at least one end face of the stator, wherein the first flange arrangement has a first flange component that has a connecting surface which adjoins the first end face of the stator and whose geometry is adapted to the geometry of the end face of the stator so that a stator winding, which is wound onto the stator and the adjoining connecting surface, connects the stator and the first flange component to one another.

19 Claims, 6 Drawing Sheets

ELECTRIC MACHINE

FIELD OF THE INVENTION

Related Applications

The instant application claims the priority benefit of German Patent Application No. 10 2008 012 680.2, filed on Mar. 5, 2008 and German Patent Application No. 10 2008 064 131.6 filed on Mar. 5, 2008, the entirety of each are hereby incorporated by reference.

The instant application is related to co-pending U.S. patent application Ser. No. 12/389,205, entitled, "Electric Machine," filed on Feb. 19, 2009, the entirety of which is incorporated by reference.

The invention relates to an electric machine that has a rotor and a stator and at least one flange arrangement that is disposed at an end face of the stator.

BACKGROUND OF THE INVENTION

A preferred field of application of the invention is in brushless dc motors and stepper motors as well as other permanent magnet motors that are configured as inner rotor motors. Inner rotor motors comprise a rotor arrangement that is mounted on a shaft and inserted coaxially into a stator arrangement. The stator body is generally made up of stamped metal laminations that carry windings. It comprises a back yoke ring on whose inner surface lie stator slots and stator poles that receive the stator winding.

In the prior art, electric machines are generally built with metal housings and mounting flanges that are disposed on one or both end faces of the housing. First, the stator is constructed as an assembly in that the stator body is built up to form, for example, a stamped lamination stack and is then wound. The rotor assembly is inserted into the stator, and the stator is fixed to the motor housing at the two mounting flanges using suitable means such as bonding, screwing, riveting, caulking, press fitting, welding etc. This kind of technique is also described in DE 695 02 496 T2 as discussed below.

In small electric motors, the available installation space is often limited so that the known methods of attaching the mounting flange on the motor housing either increase the size of the motor and, where installation space is limited, may no longer be an option, or the necessary process technology for assembly is complex and entails considerably more work and expense in production. What is more, conventional motor housings are not optimized for cooling the stator when in operation. The dissipation of heat to the environment simply takes place via the metal housing without any special arrangements being made for heat removal.

It is also known to totally dispense with an additional motor housing and to release the heat generated during operation directly from the stator surface into the environment. This is described, for example, in DE 10 2004 050 373 A1 as explained below.

DE 695 02 496 T2 describes a slotted stator for an electric machine that is made up of a plurality of stator laminations that are joined to form a lamination stack. This lamination stack forms a back yoke ring on whose inside surface lie stator slots and stator poles that receive the stator winding. The outside contour of the laminations takes the form of a regular polygon, preferably a rectangle whose edges are flattened to form a circular contour. The individual laminations are disposed at an angular offset with respect to one another such that, in projection, the flattened edges of the polygon complement one another to form a circle. In this way, the outside surface of the stator, and thus the exchange surface for dissipating heat to the environment, is made larger.

In DE 695 02 496 T1 the stator is disposed in a housing that has channels for conducting a cooling medium, such as air, between the inside surface of the housing and the outside surface of the stator, in order to cool the stator. This construction requires quite a lot of space and the special design of the housing including cooling channels is complex.

DE 10 2004 050 373 A1 describes a stator arrangement for an electric machine that is configured as an inner rotor motor, the stator having a back yoke ring and stator poles and stator slots formed on the inside surface of the back yoke ring. In order to insulate the stator poles with respect to the stator winding, an insulating coating is applied to the stator poles and stator slots. The insulating coating is injected onto the stator body such that the outside surface of the back yoke ring remains free of coating. A housing body is molded onto the stator, the housing body comprising two end-face housing sections. The bottom of the stator slots and the side surfaces of the stator poles are fully coated. The two end-face housing sections are aligned flush to the outside surface of the back yoke ring and directly adjoin this surface in order to form a sealed unit closed to the outside so that a separate housing need not be provided. The two end-face housing sections may each be connected to a flange. This goes to produce an electric machine having an extremely compact construction, which, however, in terms of cooling the stator is less favorable than the machine described initially.

It is an object of the invention to provide an electric machine that can be more easily manufactured at low cost and that has good properties in terms of heat dissipation of the stator.

SUMMARY OF THE INVENTION

The invention provides an electric machine having a rotor and a stator, the stator enclosing the rotor. A first flange arrangement is disposed on at least one first end face of the stator.

According to a first aspect of the invention, the first flange arrangement comprises a first flange component that has a connecting surface which adjoins the end face of the stator and whose geometry is adapted to the geometry of the end face of the stator. This makes it possible for a stator winding, which is wound on the stator, also to be wound over the adjoining connecting surface of the flange component, in order to connect the stator and the flange component to each other with the aid of the stator winding. The stator and flange arrangement may be connected to each other using solely the stator winding, or additional securing means, such as an adhesive or a plug-in connector, may be provided.

The flange component is preferably cup-shaped and the connecting surface forms the bottom of the cup. A second flange component can be connected to the cup-shaped first flange component, the second flange component taking the form of a cover for the first flange component. This second flange component, or even the first flange component, preferably includes a bearing support for receiving a shaft bearing. This bearing support can be integrally formed with the flange component as one piece or held in the flange component.

In the preferred embodiment of this aspect of the invention, slot insulation is applied to the stator, the connecting surface of the first flange component coming to lie between the slot insulation and the end face of the stator. The slot insulation is slid over the stator and the adjoining connecting surface before the stator winding is mounted. The slot insulation may have means for centering the flange and/or the bearing seat.

Flange arrangements are preferably provided at both end faces of the stator, which may be identical in design or vary. The outside circumference of the flanges thus formed is aligned substantially flush to the outside circumference of the stator.

According to a further aspect of the invention, slot insulation is applied to the stator and a second flange arrangement is provided at the second end face of the stator lying opposite the first end face, the second flange arrangement being centered using the slot insulation.

According to the invention, the flange arrangements directly adjoin the end face of the stator and, together with the outside circumference of the stator, form the motor housing. The second flange arrangement, however, is not centered by the outside circumference of the stator, but rather by the slot insulation. For its part, the rotor is centered via the flange arrangement or using the slot insulation. This goes to produce a motor design in which the outside circumference of the stator forms part of the motor housing and is thus not enclosed in a separate housing, resulting in an improvement in the heat dissipation of the motor to the environment. By centering the rotor and/or the flange arrangement using the slot insulation—and not via a motor housing or the outside circumference of the stator—the tolerance chain between the rotor, the stator and the flange arrangement can be shortened.

A bearing seat for a rotor bearing may be integrated into the slot insulation, or the slot insulation may have means of centering a bearing support. The bearing support for the rotor arrangement may also be provided in the flange arrangement.

In an advantageous embodiment of the invention, the slot insulation is formed with a circumferential surface against which the second flange arrangement comes to lie. The flange arrangement can, for example, be cup-shaped in form and encompass the slot insulation, so that the inside wall of the cup comes to lie against the circumferential surface of the slot insulation.

In one embodiment of the invention, the slot insulation has pins for its attachment to the second flange arrangement. These pins can be formed, for example, for the purpose of hot caulking the flange arrangement to the slot insulation.

As an alternative or in addition, a step may be formed on the outside circumference of the stator on which the second flange arrangement is placed. The second flange arrangement is then centered by both the circumferential surface of the slot insulation as well as the step, and additionally by the above-mentioned pins, where applicable. In addition or as an alternative to their connection by hot caulking the pins, the stator and the flange arrangement can also be connected to each other by means of welding, particularly laser welding, or by bonding.

In a further aspect of the described embodiments, the slot insulation also has means of centering a printed circuit board at the end face of the stator. The slot insulation and the printed circuit board may be connected to each other, for example, using snap-in fasteners or connecting pins.

In the preferred embodiment of the invention, the stator comprises a back yoke ring and stator slots and stator poles, which receive the stator winding, formed at the inside circumference of the back yoke ring. If flange arrangements are provided at both end faces of the stator, they form, together with the back yoke ring, the housing of the electric machine.

Using the construction of the electric machine according to the invention, the problem of connecting flange and stator is solved in that the flanges are centered and connected to the stator via the slot insulation and/or the stator winding, without the need for additional connecting elements or a separate housing that carries the flanges. There is no need to modify the stator itself nor is there need for any separate securing elements to be attached to the stator or to the flange. The flange arrangement only needs a connecting surface that is aligned flush with the end face of the stator and centered using the slot insulation. The stator and flange are connected to each other using the slot insulation and/or with the aid of the winding. In addition, the stator and flange may be welded together at one or both end faces of the machine.

The construction according to the invention makes it possible not only to center and connect the flange to the stator in a space-saving way without using complex process technology, but also to realize a motor design in which the outside surface of the stator remains free since a separate housing for fixing the flanges is not necessary. This allows the heat generated during operation to be dissipated directly from the outside surface of the stator to the environment.

In a further aspect of the invention, the stator is made up of a plurality of stator laminations that are joined to form a lamination stack, protrusions being formed on the outside circumference of the individual stator laminations and the stator laminations being disposed at an angular offset with respect to one another in order to increase the size of the outside surface of the stator compared to a perfectly cylindrical outside surface.

At the outside circumference of the stator laminations $(P \div n)$ protrusions are preferably formed and the individual stator laminations are offset by an angle $(360° \div P) \cdot m$ with respect to one another, where P is the number of stator poles and n and m are whole numbers greater than 0. The protrusions are preferably disposed such that they additionally increase the size of the magnetic back yoke. For this purpose, the protrusions bridge at least one stator slot between two adjacent poles; this means that a protrusion preferably extends from the radial extension of the central axis of a stator pole to the radial extension of the central axis of an adjacent pole. The protrusions may also bridge two or more stator slots.

In a particularly preferred embodiment, the protrusions take the form of segments of a circle that adjoin the cylindrical outside circumference of the stator laminations. When several stator laminations are disposed at an angular offset with respect to one another, these circular segments in turn preferably largely complement each other to form a cylindrical shape, channels being formed between the individual aligned circular segments.

Through the special design of the outside surface of the stator, which forms part of the housing of the electric machine, the sleeve surface of the housing can be made significantly larger. The outside contour of the stator laminations can be designed such that quasi "cooling fins" are formed that result in a five to tenfold increase in the surface of the outside surface of the stator.

The various aspects of the invention achieve the object underlying the invention and may be applied individually or in any combination.

BRIEF DESCRIPTION OF DRAWINGS

The invention is described in more detail below on the basis of a preferred embodiment with reference to the drawings.

DETAILED DESCRIPTION OF EMBODIMENTS

Figure 1:
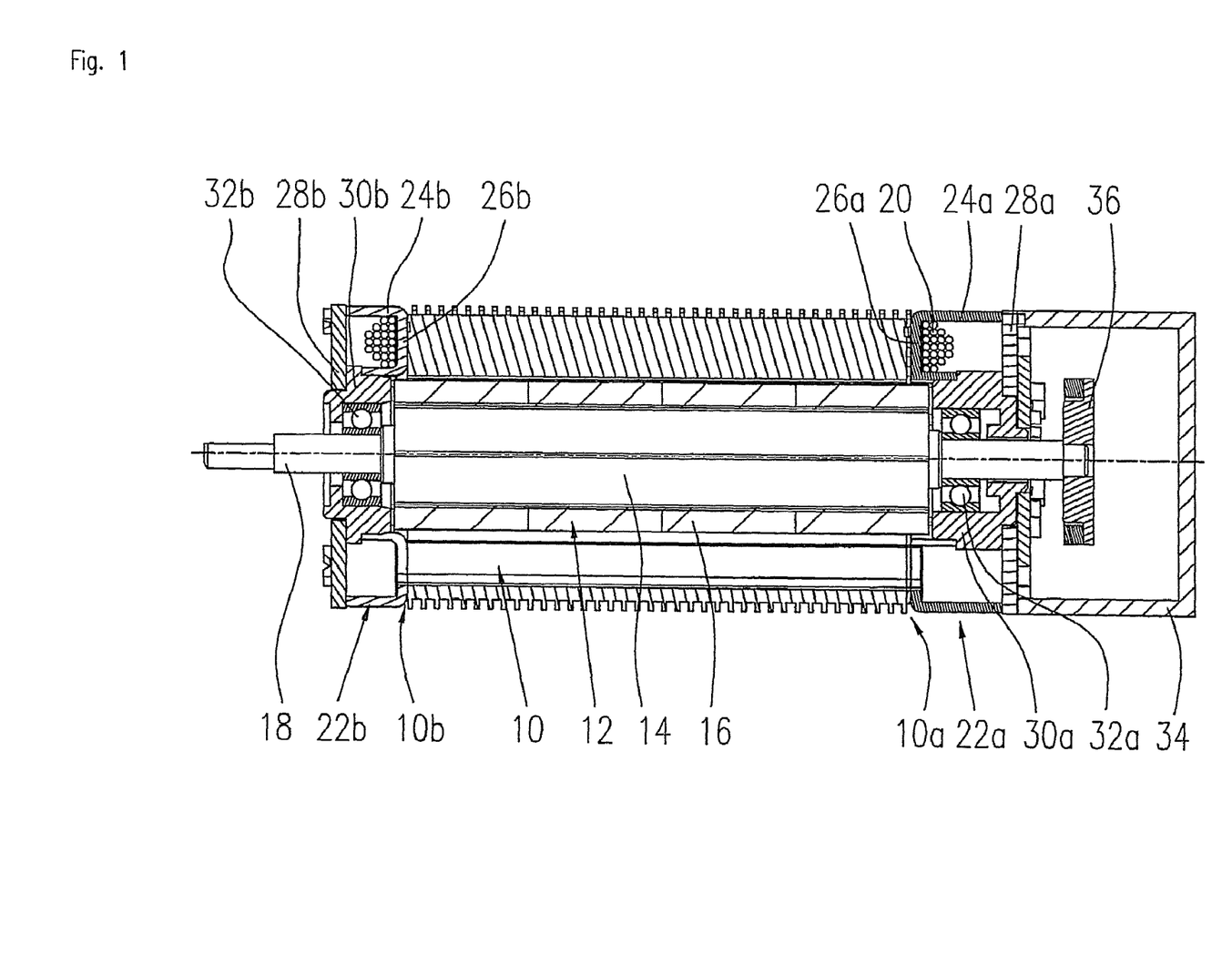
FIG. 1 shows a sectional view through an electric machine according to an embodiment of the invention.

FIG. 1 shows a sectional view through a brushless dc motor that is constructed according to a first embodiment of the invention. The motor comprises a stator 10 and a rotor 12 that is enclosed by the stator 10. The rotor 12 comprises a magnet carrier 14 as well as permanent magnets 16 that are mounted on a shaft 18. The magnet carrier 14 may be made of a ferromagnetic material in order to form a back yoke for the permanent magnets 16.

The stator 10 comprises a back yoke ring and stator slots and stator poles that are formed on the inside circumference of the back yoke ring and which receive a stator winding 20. The stator 10 is made up of a plurality of stator laminations that are joined to form a lamination stack, as described in more detail below.

Figure 2:
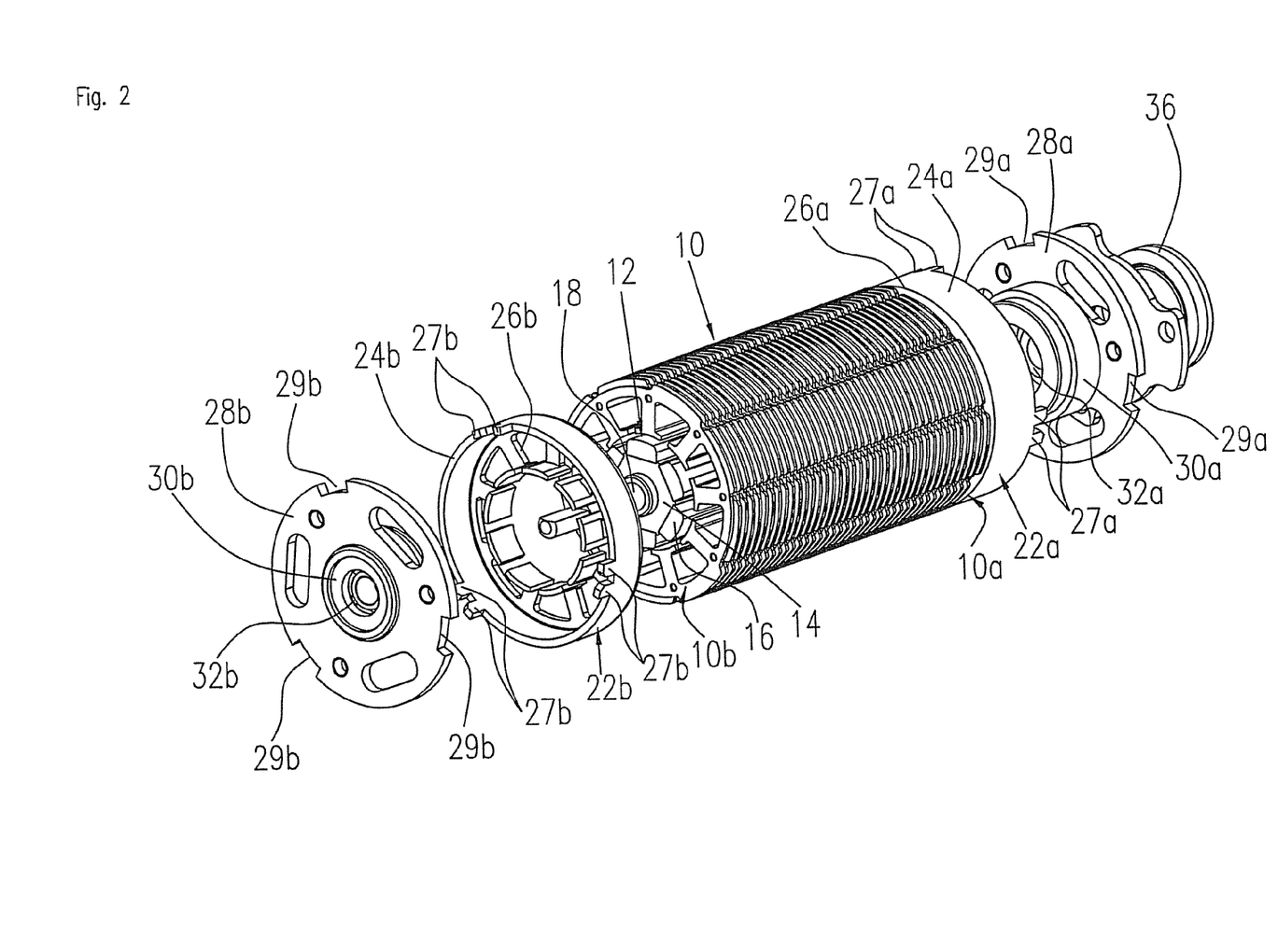
FIG. 2 shows an exploded view of the electric machine of FIG. 1.

At each end face of the stator 10a and 10b, a flange arrangement 22a, 22b is connected to the stator 10. Each flange arrangement 22a, 22b comprises a first flange component 24a, 24b that is cup-shaped in form. The geometry of the cup bottom 26a, 26b is adapted to the geometry of the end face of the stator. This means that the geometry of the cup bottoms 26a, 26b is adapted to the lamination blanks of the stator, having stator poles and stator slots as shown in FIG. 2, to such an extent that, when the stator 10 is wound, it is also possible to wind the stator winding 20 over the cup bottom 26a, 26b as well, thus fixedly connecting the first flange components 24a, 24b to the stator 10. The geometry of the cup bottoms 26a, 26b can, but need not, largely conform to the lamination blank of the stator.

The first flange components 24a, 24b are each closed by second flange components 28a, 28b. In the illustrated embodiment, these second flange components 28a, 28b are designed as simple disk-shaped covers. They each hold a bearing seat 30a, 30b for receiving ball bearings 32a, 32b for supporting the shaft 18. The second flange components 28a, 28b can be connected to the first flange components 24a, 24b by caulking or in some other way.

In the illustrated embodiment, a sensor cover 34 adjoins the end face of the first flange arrangement 22a, a sensor magnet 36 that is connected to the shaft 18 being disposed in the sensor cover 34.

The electric machine according to the invention is designed such that the housing of the machine is formed by the two-piece flange arrangement 22a, 22b and the outside surface of the stator 10, so that a separate housing is not needed. The flanges 22a, 22b directly adjoin the stator 10. The flange components can be made, for example, as deep drawn parts or as punched bent parts, the cup bottoms 26a, 26b reproducing the geometry at the end face of the stator. Before the stator 10 is wound, the first flange components 24a, 24b are disposed on the two end faces 10a, 10b of the stator and then wound and possibly trickle impregnated, i.e. sprayed with an insulating liquid and then tempered. In this way, an assembly is realized in which the flanges are fixedly connected to the stator by the stator winding without requiring any additional connecting elements. The second flange components 28a, 28b can subsequently be inserted into the first flange components 24a, 24b. The second flange components 28a, 28b can be simply made, for example, from a stamped plate and caulked to the first flange components 24a, 24b or connected in some other way.

Alongside a very simple assembly process, the construction according to the invention makes it also possible for the rotor 12 to be easily and precisely centered because the positioning and centering of the ball bearings 32a, 32b using the flange arrangements 22a, 22b is directly aligned to the inside diameter of the stator 10. Compared to the arrangement of bearing seats in flanges that are connected to a housing, this method goes to shorten the tolerance chain from the stator to the rotor. This goes to reduce the requirements placed on the concentricity of the flange arrangement 22a, 22b or provides the potential for reducing the air gap between the stator and the rotor. Despite the compact construction of the electric machine, this makes it possible to increase performance.

FIG. 2 shows an exploded view of the motor according to the invention, with which the assembly of the motor in relation to the flange arrangement 22b is represented. The same situation applies accordingly to flange arrangement 22a. The cup bottom 26b of the first flange component 24b corresponds in its geometry to the end face 10b of the stator 10. The first flange component 24b is placed on the stator and wound together with the stator. The projections 27b at the circumference of the first flange component 24b pointing in an axial direction are used to connect the first flange component to the second flange component 28b. They lie opposite corresponding recesses 29b in the second flange component 28b and are connected to the second flange component 28b by caulking. Shown are three recesses 29b and three projections 27b, each consisting of two noses, where it is possible to have a different number of projections and design of the projections and generally a different kind of connection for the flange parts.

The bearing support 30b that carries the ball bearing 32b is inserted into the second flange component 28b. When the second flange component 28b is connected to the first flange component 24b, by caulking the flange arrangement 22b for example, the bearing seat 30b is centered through its contact with the cup bottom 26b. In a preferred variant of this embodiment of the invention, the bearing seat 30b is centered with the aid of slot insulation that is applied to the stator. Slot insulation of this kind can be injected onto the stator or slid onto the stator as a separate component (not illustrated). It comes to lie between the end face of the stator and the bottom of the first flange component and is fixed to the stator together with the flange arrangement by the winding. According to the invention, the slot insulation can be molded with some means of centering the bearing support.

Moreover, it is possible to extend the first flange component 24b in an axial direction and thus make the space between the cup bottom 26b and the second flange component larger. This space within the flange arrangement 22b may be used, for example, for receiving a fan wheel for cooling the motor.

A further embodiment of the invention in which the slot insulation is used to center the rotor and/or the flange arrangement with respect to the stator and the rotor is described below with reference to FIGS. 3 to 5.

In this embodiment, the flange arrangement is connected to the stator at one end face of the electric machine in a similar way as described with reference to FIG. 1, whereas at the other end face of the electric machine a different kind of centering and connection for the flange arrangement is provided.

Figure 3:
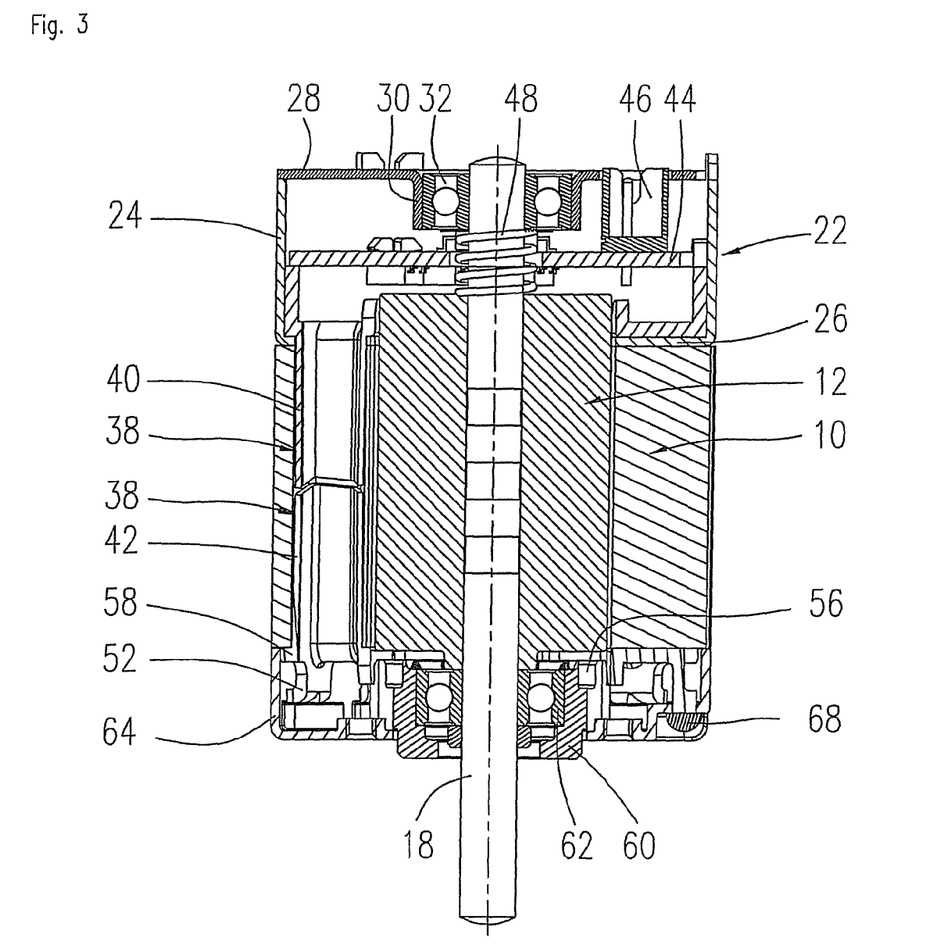
FIG. 3 shows a sectional view through an electric machine according to a further embodiment of the invention.
Figure 4:
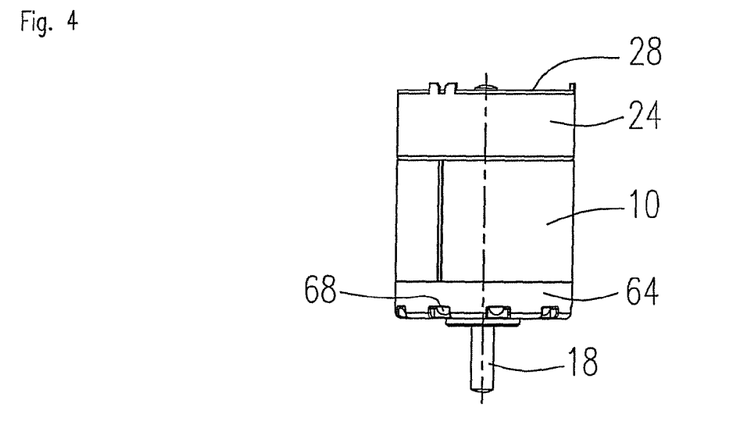
FIG. 4 shows a side view of the electric machine of FIG. 3.
Figure 5:
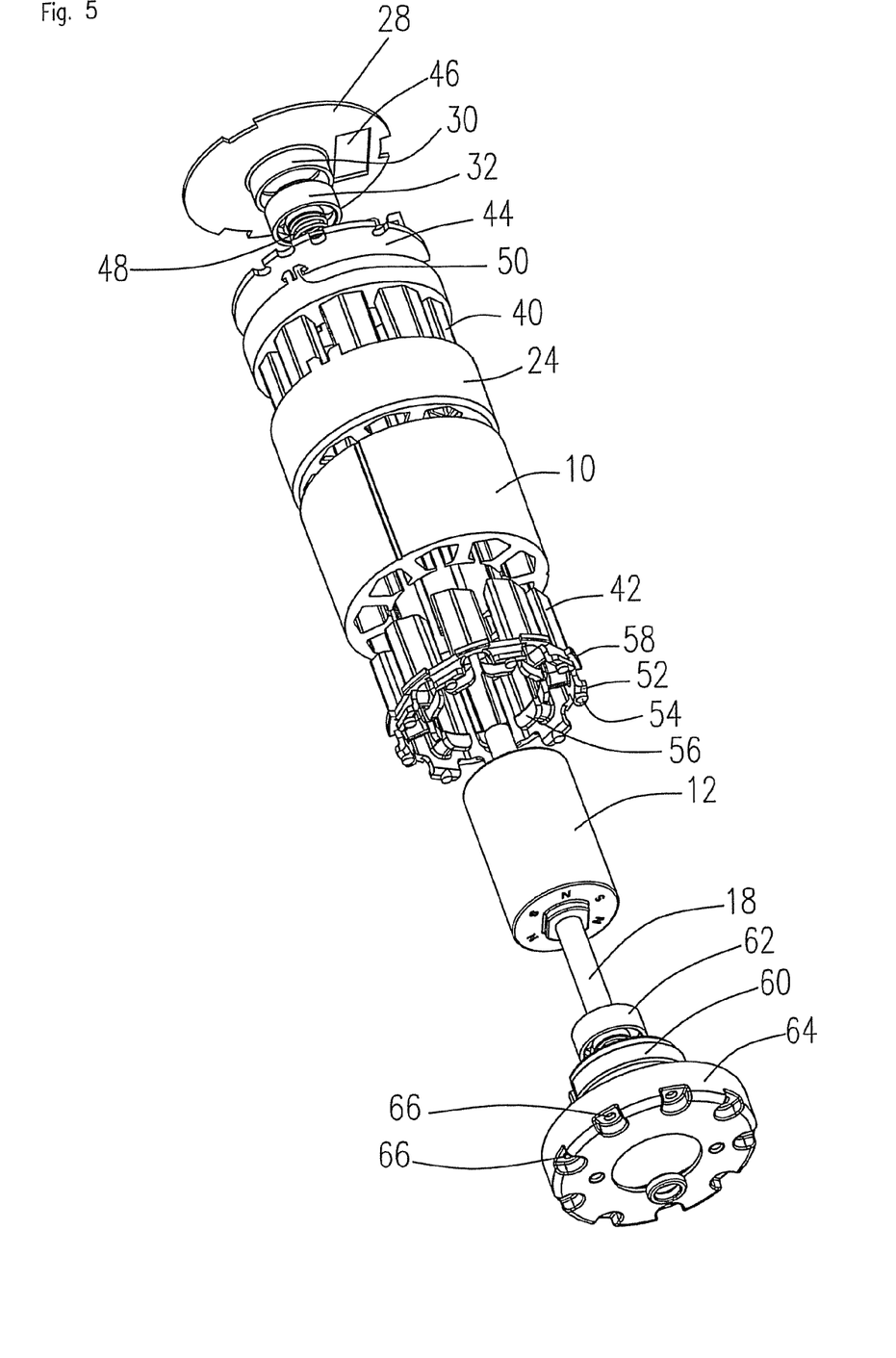
FIG. 5 shows an exploded view of the electric machine of FIG. 3.

The electric machine shown in FIGS. 3 to 5 comprises a stator 10 and a rotor 12 that is enclosed by the stator 10. A first flange arrangement 22 is provided at an end face of the stator 10 that is constructed in a similar way to the previously described embodiment. The first flange arrangement 22 comprises a first flange component 24 that is cup-shaped in form. The geometry of the cup bottom 26 is adapted to the geometry of the end face of the stator, so that when the stator 10 is wound, the stator winding (not illustrated in FIG. 3) can also be wound over the cup bottom 26, thus fixedly connecting the first flange component 24 to the stator 10.

The first flange component 24 is closed by a second flange component 28. In the illustrated embodiment, a bearing seat 30 is integrated into the second flange component 28. The bearing seat 30 holds a ball bearing 32 for supporting the shaft 18. The second flange component 28 can be connected to the first flange component 24 by caulking, welding or in some other way.

Before the stator is wound, slot insulation is applied to the stator which, in the illustrated embodiment, comprises two insulation members 40, 42. Insulation member 40 is associated with the end face of the stator 10 having the cup-shaped flange arrangement 22. The slot insulation is made of plastics and is preferably an injection-molded plastic part that is formed such that it is slid in an axial direction onto the stator 10 and inserted into the slots of the stator.

When, in the embodiment of FIG. 3, the electric machine is assembled, first the cup-shaped flange component 24 is aligned to the end face of the stator 10, and then the insulation member 40 is slid on in an axial direction so that it engages in the slots of the stator 10 and centers and fixes the flange component 24 with respect to the stator. Through the subsequent winding of the stator, as described with reference to FIG. 1, the flange component 24 is fixedly connected to the stator 10.

In the embodiment of FIGS. 3 to 5, the insulation member 40 has means of centering and fixing a circuit board 44 that carries the components for the control and supply of the electric machine. The connection between the insulation member 40 and the circuit board 44 can be realized, for example, using snap-in fasteners 50, such as clips.

A recess 46 is formed in the second flange component 28 in which a socket for connecting the electric machine to signal and supply lines may be provided.

The inner race of the ball bearing 32 is preloaded using a spring 48. In the embodiment of FIG. 3, the rotor 12 is extended in an axial direction with respect to the stator 10 and delivers an axial magnetic leakage field to a magnetic sensor, such as a Hall sensor that is provided on the circuit board 44, in order to measure the rotational position, rotational direction and/or rotational speed of the electric machine.

In the embodiment of FIG. 3 to 5, the insulation member 40 of the slot insulation at one end face of the electric machine is used not only for centering the flange 22 but also for centering the circuit board 44 and, via the flange 22, also for centering the ball bearing 32 for supporting the rotor 12. The rotor is thus centered using the slot insulation with reference to the inside circumference of the stator and not, as is usual in the prior art, with respect to the outside circumference of the stator or with respect to a housing, so that the tolerance chain from the stator to the rotor can be made shorter.

In the embodiment of FIG. 3 to 5, a second flange arrangement is provided on the drive side of the electric machine, the second flange arrangement having a different method of centering and fixing the flange. The insulation member 42 of the slot insulation is also inserted at this end face of the electric machine into the slots of the stator 10 in an axial direction.

Wire guides 52 are molded on the insulation member 42 from which connecting pins 54 project in an axial direction that are used to connect the insulation member 42 to the flange, as described below. Furthermore, the insulation member 42 has projections 56 extending inwards in a radial direction for centering a bearing seat as well as projections 58 extending outwards in a radial direction for centering the flange. A bearing seat 60 comes to lie against the projections 56 and receives a ball bearing 62 for supporting the shaft 18 and thus the rotor 12. Since the insulation member 42 is fitted into the stator 10 and thus aligned with respect to the stator, the rotor 12 can then be directly centered and positioned with respect to the stator with the aid of the slot insulation.

A flange component 64 of the second flange arrangement is slid from the end face over the insulation member 42 in an axial direction, so that the connecting pins 54 of the insulation member 42 come to lie in appropriate holes 66 in the flange component 64. In this way, the flange component 64 is centered with respect to the insulation member 42 and thus with respect to the stator and the rotor. In the preferred embodiment, the connecting pins 54 are moreover designed such that they jut out of the holes 66 so that the slot insulation can be connected to the flange component 64 by hot caulking the connecting pins 54. Domes 68 are thereby formed on the free ends of the connecting pins 54, which ensure a long-lasting connection of the flange component 64 to the insulation member 42 and thus to the electric machine. The domes 68 can best be seen in FIG. 3.

As shown in FIG. 4, the described arrangement produces an electric machine whose housing is formed by the outside circumference of the stator 10 as well as the outside surfaces of the flange components 24 and 64. The slot insulation lies fully within these components and more or less forms the skeleton of the electric machine.

The design of the second flange arrangement at the drive side of the electric machine of FIG. 3 has the advantage over the first flange arrangement described at the outset that, even after the stator has been wound, the interior of the electric machine is still accessible, thus making the connection of the winding wires easier since the second flange arrangement is mounted in a subsequent operation independent of the winding. The second flange arrangement is integrally formed as one piece and the centering and connection of the second flange arrangement with the aid of the slot insulation is made simple and easily realized. The described connection using the connecting pins is particularly suitable for short connections in which there is no need to accommodate a circuit board or any other components within the flange, as is the case at the opposite end face of the electric machine.

In the described embodiments, the flange components are centered with respect to the stator directly or by using the slot insulation, and the rotor is centered with respect to the stator via the flange components or directly using the slot insulation. The circuit board as well can be centered directly using the slot insulation. Compared to the prior art in which centering requires an additional housing, this method goes to shorten the tolerance chain. According to the invention, the slot insulation is moreover used to fix the flange components and/or the circuit board to the electric machine. The various characteristics of the slot insulation and other components of the electric machine used for centering and fixing that are described in the above embodiments may be used individually or in any combination.

Figure 6A:
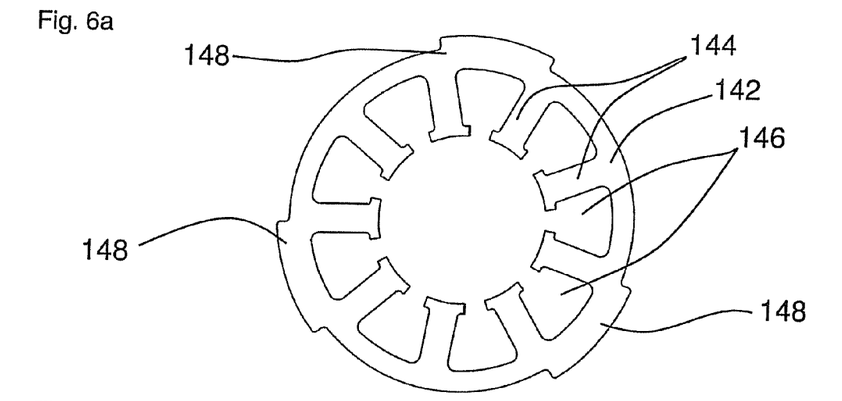
FIGS. 6a, 6b and 6c show views from above of individual stator laminations that are used to build up the stator according to the invention.

FIG. 6a shows a view from above of a lamination blank for forming the stator 10 according to the invention. The lamination blank comprises a back yoke ring 142 on whose inside surface stator poles 144 are disposed, as well as stator slots 146 located between the stator poles 144. In this respect, the lamination blank does not differ from a conventional stator blank for an inner rotor machine.

According to the invention, protrusions 148 are formed on the outside circumference of the individual stator laminations and thus on the outside circumference of the back yoke ring 142, the protrusions 148 being, in the preferred embodiment of the invention, formed as segments of a ring. In this application, however, all geometries in which parts protrude outwards from a cylindrical sleeve surface of the stator laminations are referred to as protrusions. Protrusions can thus be formed in that the outside contour of the stator laminations is given a polygon form or an irregular shape, so that parts of the stator laminations protrude from an originally cylindrical sleeve surface of the stator.

Figure 6B:
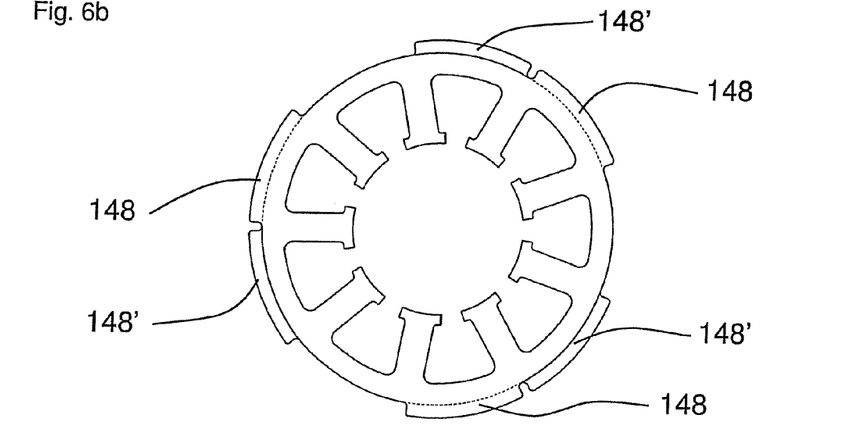
Figure 6C:
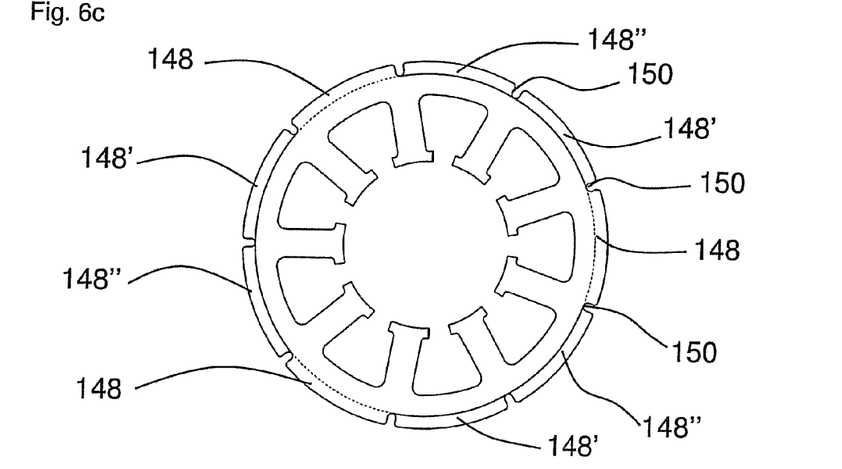

In the preferred embodiment of the invention, the stator laminations are formed with regularly disposed protrusions 148 shaped like segments of a ring, as illustrated in FIGS. 6a to 6c. In the case of the illustrated embodiment of a nine pole stator, three protrusions are formed on each stator lamination, it being expedient if the number of protrusions is an integral fraction ($\frac{1}{2}$, $\frac{1}{3}$, $\frac{1}{4}$, . . . ) of the number of stator poles. The protrusions 148 are preferably disposed such that they also increase the size of the magnetic back yoke. For this purpose, the protrusions bridge at least one stator slot 146 between two adjacent poles 144.

In the illustrated embodiment, all the stator laminations have the same design and are stacked one on top of the other at an angular offset to one another, as shown in FIGS. 6b and 6c. The angular offset is an integral multiple of the pole pitch, so that the stator poles 144 are stacked in alignment with one another.

In FIGS. 6b and 6c, the protrusions of a first lamination are indicated by 148, the protrusions of the second lamination are indicated by 148', and the protrusions of the third lamination are indicated by 148", in order to make the relative positions of the protrusions clear.

Figure 7:
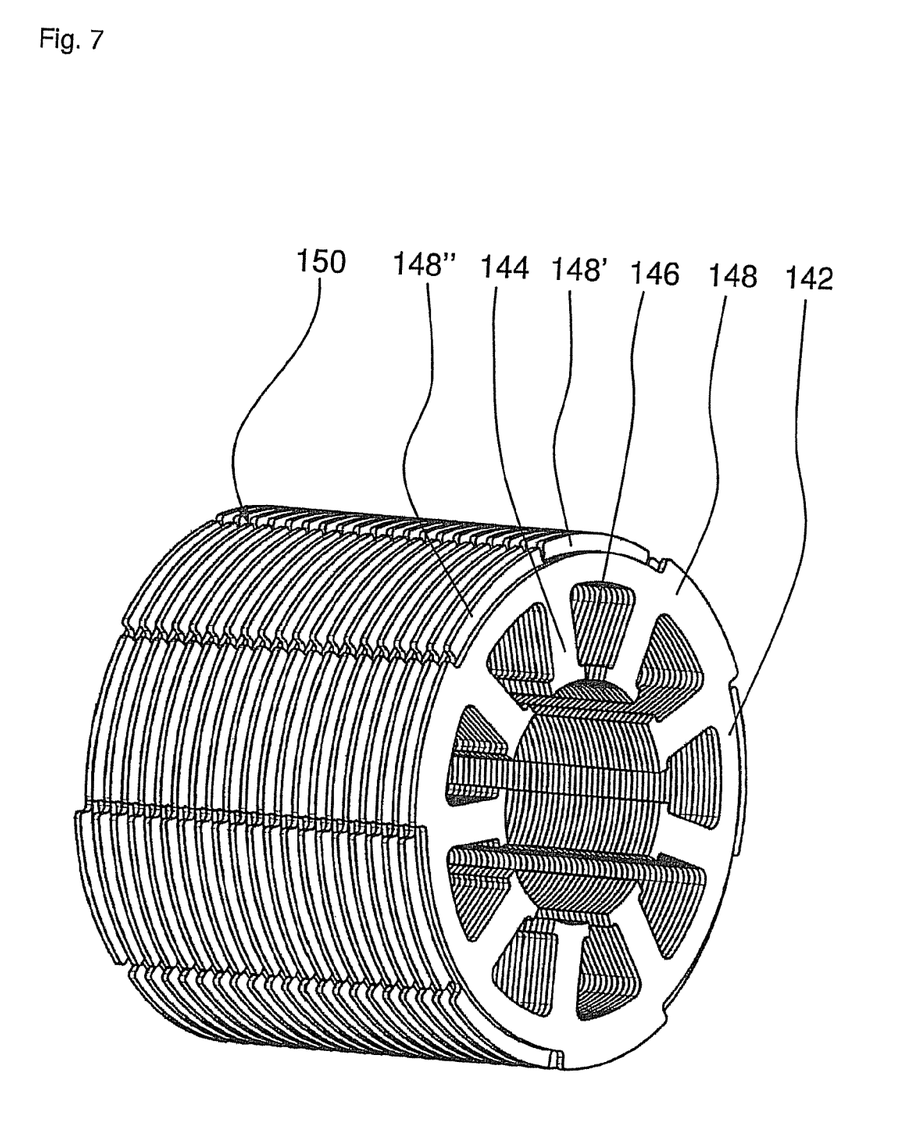
FIG. 7 shows a perspective view of the stator body that is used in the machine according to the invention.

FIG. 7 shows a stator construction for an electric machine according to the invention in which a plurality of laminations illustrated in FIGS. 6a to 6c are joined to form a stator body. It can be seen from FIG. 7, that through the protrusions 148, 148', 148" cooling fins are virtually formed on the outside surface of the stator, where two groups of aligned protrusions 148, 148', 148" are separated by channels 150 running lengthways. In projection, the protrusions 148, 148', 148" thus form a cylindrical sleeve surface of the stator body that is interrupted, however, by the channels 150 running lengthways.

Since the electric machine according to the invention is constructed such that the outside surface of the stator acts as a housing, the design of the stator laminations according to the invention make it possible to optimize the heat dissipation of the stator to the environment. Compared to a cylindrical stator, the increase in surface area is approximately five to tenfold.

The features disclosed in the above description, the claims and the figures can be important for the realization of the invention in its various embodiments both individually and in any combination whatsoever.

What we claim is:

1. An electric machine comprising:
    a rotor and a stator that encloses and houses the rotor;
    slot insulation applied to the stator;
    a first flange arrangement on at least one first end face of the stator, and
    a second flange arrangement provided on a second end face of the stator lying opposite the first end face, the slot insulation having a means of centering the rotor and the second flange arrangement with respect to the stator on the second end face of the stator,
    wherein the first flange arrangement has a cup-shaped first flange component that has a connecting surface forming the bottom of the cup and which adjoins the first end face of the stator, the connecting surface lying between the slot insulation and the end face of the stator and the connecting surface aligning with the end face of the stator, so that a stator winding fixedly connects the stator and the first flange component to one another over the cupped bottom, said stator winding being wound onto the stator and the adjoining connecting surface.

2. An electric machine according to claim 1, wherein the first flange arrangement has a second flange component that is formed as a cover for the first flange component and is connected to the first flange component.

3. An electric machine according to claim 2, wherein the first and the second flange component are caulked together.

4. An electric machine according to claim 1, wherein the slot insulation has a means of centering a printed circuit board disposed on the end face of the stator.

5. An electric machine according to claim 1, wherein identical or varying flange arrangements are disposed at both end faces of the stator.

6. An electric machine according to claim 1, wherein the slot insulation has means of centering a bearing support for a rotor bearing.

7. An electric machine according to claim 6, wherein the second flange arrangement has a bearing seat for a rotor bearing.

8. An electric machine according to claim 1, wherein the slot insulation has a circumferential surface against which the second flange arrangement comes to lie.

9. An electric machine according to claim 8, wherein the second flange arrangement encompasses the slot insulation in the region of its circumferential surface.

10. An electric machine according to claim 1, wherein the slot insulation has pins for its attachment to the second flange arrangement.

11. An electric machine according to claim 10, wherein the pins are formed for making a connection using hot caulking.

12. An electric machine according to claim 1, wherein the second flange arrangement has a cup-shaped flange component that encompasses the slot insulation and is in contact with the stator.

13. An electric machine according to claim 1, wherein the outside circumference of the flange arrangements are aligned substantially flush with the outside circumference of the stator.

14. An electric machine according to claim 13, wherein the stator has a back yoke ring, stator slots and stator poles, which receive the stator winding, the stator winding formed on the inside circumference of the back yoke ring, wherein the flange arrangements, together with the back yoke ring, form the housing of the electric machine.

15. An electric machine according to claim 1, wherein the slot insulation has a first and a second insulation member that are inserted into the stator slots from opposite end faces of the stator.

16. An electric machine according to claim 1, wherein the slot insulation has a first and a second insulation member that are inserted into the stator slots from opposite end faces of the stator.

17. An electric machine according to claim 1, wherein the stator is built from a plurality of stator laminations that are joined to form a lamination stack, and wherein protrusions are formed at the outside circumference of the individual stator laminations, the stator laminations being disposed at an angular offset to one another in order to make the outside surface of the stator larger than a perfectly cylindrical outside surface.

18. An electric machine comprising:
- a rotor and a substantially annular stator having opposing end faces, the stator housing the rotor;
- slot insulation applied to the stator; and
- two flange arrangements, each disposed at opposing end faces of the stator,
- wherein the slot insulation centers the rotor and at least one flange arrangement with respect to an inside circumference of the stator.

19. An electric machine comprising:
- a rotor and a substantially annular stator having opposing end faces, the stator housing the rotor;
- slot insulation applied to the stator; and
- two flange arrangements, each disposed at opposing end faces of the stator and including a bearing seat for a rotor bearing,
- wherein the slot insulation centers a bearing support for the rotor bearings to thereby center the rotor with respect to the stator.

\* \* \* \* \*